(12) United States Patent
Kim et al.

(10) Patent No.: US 8,845,994 B2
(45) Date of Patent: Sep. 30, 2014

(54) ELECTRODE ACTIVE MATERIAL HAVING HIGH CAPACITANCE, METHOD FOR PRODUCING THE SAME, AND ELECTRODE AND ENERGY STORAGE DEVICE COMPRISING THE SAME

(75) Inventors: Ick Jun Kim, Busan (KR); Sun Hye Yang, Gyeongsangnam-do (KR); Seong In Moon, Gyeongsangnam-do (KR); Hyun Soo Kim, Gyeongsangnam-do (KR); Min Jae Jeon, Busan (KR)

(73) Assignee: Korea Electrotechnology Research Institution, Changwon-Si, Gyeongsangnam-Do (KR)

( * ) Notice: Subject to any disclaimer, the term of this patent is extended or adjusted under 35 U.S.C. 154(b) by 1180 days.

(21) Appl. No.: 11/673,331

(22) Filed: Feb. 9, 2007

(65) Prior Publication Data

US 2007/0195488 A1 Aug. 23, 2007

(30) Foreign Application Priority Data

Feb. 23, 2006 (KR) .................. 10-2006-0017611

(51) Int. Cl.
| | | |
|---|---|---|
| C01B 31/00 | (2006.01) | |
| C01B 31/26 | (2006.01) | |
| C01B 31/02 | (2006.01) | |
| D01F 9/12 | (2006.01) | |
| D01F 9/16 | (2006.01) | |
| C01B 31/08 | (2006.01) | |
| B01J 21/00 | (2006.01) | |
| B01J 21/18 | (2006.01) | |
| B01J 23/00 | (2006.01) | |
| H01M 4/13 | (2010.01) | |
| H01M 4/58 | (2010.01) | |
| H01M 4/02 | (2006.01) | |
| H01M 6/00 | (2006.01) | |
| H01G 11/34 | (2013.01) | |
| H01M 4/587 | (2010.01) | |
| H01G 9/04 | (2006.01) | |

(52) U.S. Cl.
CPC .............. *H01G 9/058* (2013.01); *Y02E 60/13* (2013.01); *H01G 11/34* (2013.01); *Y02T 10/7022* (2013.01); *H01M 4/587* (2013.01); *Y02E 60/12* (2013.01)

USPC .................. 423/445 R; 423/444; 423/447.9; 423/447.1; 502/416; 502/100; 502/174; 502/180; 429/231.8; 429/218.1; 429/209; 429/122

(58) Field of Classification Search
None
See application file for complete search history.

(56) References Cited

U.S. PATENT DOCUMENTS

| | | | | | |
|---|---|---|---|---|---|
| 3,023,118 | A | * | 2/1962 | Donnet ......................... | 106/473 |
| 4,371,454 | A | * | 2/1983 | Hisatsugu et al. ................ | 502/9 |
| 5,021,164 | A | * | 6/1991 | Gay ............................... | 210/694 |
| 6,118,650 | A | * | 9/2000 | Maeda et al. ................. | 361/508 |
| 2002/0182478 | A1 | * | 12/2002 | Uchida et al. ................... | 429/44 |
| 2003/0092560 | A1 | * | 5/2003 | Von Blucher et al. ......... | 502/10 |
| 2005/0219797 | A1 | * | 10/2005 | Nakamura et al. ............ | 361/502 |
| 2013/0260246 | A1 | * | 10/2013 | Chen et al. .................... | 429/221 |
| 2014/0072879 | A1 | * | 3/2014 | Chen et al. .................... | 429/300 |

FOREIGN PATENT DOCUMENTS

| | | |
|---|---|---|
| JP | 2001-085063 | 3/2001 |
| JP | 2002-025867 | 1/2002 |
| JP | 2005-347517 | 12/2005 |

OTHER PUBLICATIONS

Nian et al.; Nitric Acid Modification of Activated Carbon Electrodes for Improvement of Electrochemical Capacitance; Journal of the Electrochemical Society; 148, 8, A1008-A1014; 2002.*

* cited by examiner

*Primary Examiner* — Guinever Gregorio
(74) *Attorney, Agent, or Firm* — Rodman & Rodman

(57) ABSTRACT

An active material of the present invention has fine pores formed in the interlayer of a carbon material capable of exhibiting electrochemical double layer capacitance. The fine pores are formed by forming an oxidized graphite structure combined with oxygen in the interlayer of a part or whole of the carbon material containing soft carbon and then removing a part or whole of oxygen in the interlayer. A method for producing an energy storage active material for use in an electrochemical double layer capacitor comprises pre-treating a carbon material through heat treatment and oxidizing the pre-treated carbon material using an oxidant. The method further comprises reducing the oxidized carbon material through heat treatment. The interlayer distances of an active material for respective steps, measured by a powder X-ray diffraction method, are 0.33~0.36 nm in the pre-treatment step, 0.5~2.1 nm in the oxidation step, and 0.34~0.5 nm in the reduction step.

9 Claims, No Drawings

ELECTRODE ACTIVE MATERIAL HAVING HIGH CAPACITANCE, METHOD FOR PRODUCING THE SAME, AND ELECTRODE AND ENERGY STORAGE DEVICE COMPRISING THE SAME

BACKGROUND OF THE INVENTION

1. Field of the Invention

The present invention relates to an electrode active material, an electrode having the active material, and a method for producing the active material.

2. Description of the Related Art

A currently available energy storage device includes an electrochemical double layer capacitor, a hybrid capacitor, a lithium secondary battery, a solar cell, a fuel cell or the like. More specifically, the energy storage device includes a lithium secondary battery or an electrochemical double layer capacitor (EDLC) typically called a supercapacitor.

A lithium secondary battery has an advantage of a high energy density of 20~120 Wh/kg but has disadvantages of a low power density of 50~250 W/kg and a low cycle life of about 500 times.

An EDLC can be rapidly charged or discharged and has a strong over-charging and/or over-discharging characteristic. Further, the EDLC can provide an extended service life span and can be employed in a wide range of temperatures, since it does not involve chemical reactions. Furthermore, the EDLC is environmentally friendly since it does not contain heavy metals. That is, since the EDLC has a variety of characteristics that no battery provides, it has been widely employed in a memory back-up power supply and the like.

Recently, a high-capacity model has been rapidly developed and an application to a high performance energy (storage) device has also been attempted. Thus, a variety of applications to a power storage system with solar cells and fuel cells, an auxiliary power source for hybrid electric vehicle (HEV) and the like have been investigated or considered.

The lithium battery and the EDLC are very similar in view of their unit cell structures and operating principles, but are different from each other in view of their charge storage mechanisms. That is, in case of the lithium secondary battery, since electrons and ions are transferred into the bulk of electrode material and the transfer relies on a Faradaic reaction, a phase transformation of an electrode material is involved. On the other hand, in an EDLC, such a Faradaic reaction is not involved (i.e., non-Faradaic process), a charging or discharging reaction is produced only at an interface (electrochemical double layer) of electrode and electrolyte, without any phase transformation of the active material.

In the meantime, a hybrid capacitor has been proposed to compensate for the disadvantages of the lithium secondary battery and EDLC.

An EDLC is configured in such a manner that a pair of positive and negative polarizing electrodes each formed of active carbon are disposed in an electrolyte containing electrolytic ions in a state where a partition membrane is interposed between the electrodes. If a direct current is applied to the electrodes, anions in an electrolytic solution move toward the positive electrode and cations move toward the negative electrode while the voltage is increased. These anions and cations form an electrochemical double layer at the interface between the electrode and the solution, which in turn is used as electric energy.

The conventional EDLC has superior power density but poor energy density. In order to apply the EDLC to energy devices, it is necessary to develop a capacitor with larger capacitance. In order to increase the capacitance of an EDLC, it is indispensable to develop an electrode material capable of forming a lot of electrochemical double layers.

Therefore, in order to form a lot of electrochemical double layers, the use of active carbon having a large specific surface area has been considered. However, the active carbon with a larger specific surface area has excellent specific capacitance per mass (F/g) but causes the decrease in the electrode density. As a result, there is a limitation in improving the specific capacitance per volume (F/ml).

An alkaline activation method of carbonizing a soft or graphitizing carbon material and then activating the carbon material together with caustic alkali at a high temperature has been proposed to increase capacitance per volume. For example, if a soft carbon material serving as a polarizing electrode material is activated together with caustic alkali such as KOH, CsOH and RbOH at a temperature of 600~800° C. under an inert atmosphere, it is possible to manufacture non-porous carbon having a fine grain size similar to graphite and a interlayer distance $d_{002}$ of 0.360~0.380 nm. This non-porous carbon has a low specific surface area of 270 m$^2$/g or less. However, when it is used as an electrode material of EDLC, the non-porous carbon exhibits a high capacitance per volume of 30 F/ml or more. It is believed to be due to the intercalation of electrolytic ions including solvent between layers of graphite-like fine grains.

However, the active carbon produced by the above alkaline activation process has a problem in that charge/discharge cycle characteristics are degraded by means of the expansion or cracking of electrodes due to the repeated intercalation and deintercalation of electrolytic ions into the interlayer, gas generation and the like, and the distortion of a container material as the charging/discharging process is repeated after forming an electrode of EDLC.

SUMMARY OF THE INVENTION

In order to suppress the expansion of an electrode, a method of treating soft carbon with oxygen and then executing alkaline activation can be considered. Alternatively, a method of mixing carbon materials which form hard and soft carbon through a heating process and executing alkaline activation to produce active carbon may be considered.

However, an alkaline activation process performed at an elevated temperature may cause the inclusion of foreign substances and corrosion of manufacturing equipment due to a reaction between the container and the active carbon. Further, the manufacturing costs are increased due to additional processes of suppressing the expansion of active carbon produced by the alkaline activation method. Thus, it is difficult to commonly utilize a process of producing active carbon with high capacitance per volume using the alkaline activation method.

The present invention is conceived to solve the aforementioned problems in the prior art. An object of the present invention is to provide an electrode active material wherein contrary to active carbon produced by a conventional alkaline activation method, a carbon material containing soft carbon is partially or completely oxidized to form an oxidized graphite structure, and selectively, a reduction process is further performed through heat treatment, thereby simplifying the entire process and also significantly increasing an interlayer distance of active carbon to provide large capacitance per volume and to reduce expansion of an electrode due to application of voltage to the electrode. Another object of the present invention is to provide a method of producing such an electrode active material, and an electrode and an energy storage device comprising the electrode active material.

According to the present invention for achieving the object, there is provided a method for producing an electrode active material for an energy storage device, which comprises the steps of pre-treating a carbon material through heat treatment, and oxidizing the pre-treated carbon material using an oxidant.

The method of the present invention may further comprise the step of cleansing the oxidized carbon material.

The method of the present invention may further comprise the step of reducing the oxidized carbon material through heat treatment.

The carbon material may be or comprise soft carbon.

The soft carbon may be formed of one or more materials selected from a group consisting of aliphatic polymer compound such as vinyl chloride resin and polyacrylonitrile, aromatic polymer compound such as mesophase pitch and polyimide, coal tar pitch, petroleum coke, coal tar coke, mesocarbon microbeads, and mesophase pitch spinning fiber.

The pre-treating step may comprise the step of heat treating a carbon material for 2~24 hours at a temperature range of 300~2000° C. under an inert atmosphere.

The oxidation step may comprise the step of oxidizing a carbon material in a solution containing an oxidant.

The oxidant may include one or more selected from a group consisting of $HNO_3$, $H_2SO_4$, $H_3PO_4$, $H_4P_2O_7$, $H_3AsO_4$, HF, $H_2SeO_4$HClO_4$, $CF_3COOH$, $BF_3(CH_3COOH)_2$, $HSO_3F$, $H_5IO_6$, $KMnO_4$, $NaNO_3$, $KClO_3$, $NaClO_3$, $NH_4ClO_3$, $AgClO_3$, $HClO_3$, $NaClO_4$, $NH_4ClO_4$, $CrO_3$, $(NH_4)_2S_2O_8$, $PbO_2$, $MnO_2$, $As_2O_5$, $Na_2O_2$, $H_2O_2$, $N_2O_5$, $C_2H_5OH$ and $CH_3OH$.

The oxidation step may comprise the step of adding 0.5~10 parts by weight of the oxidant to 1 part by weight of the carbon material.

The oxidation step may be performed at a temperature range of 0~100° C.

The step of reducing the oxidized carbon material through heat treatment may comprise the step of heat treating an oxidized carbon material for 0.1~100 hours at a temperature range of 100~1000° C. and at a high vacuum pressure of no more than $10^{-1}$ torr under an inert or reductive gas atmosphere.

According to another aspect of the present invention, there is provided an electrode active material for an energy storage device produced by heat treating and oxidizing a carbon material, wherein an interlayer distance of a part or whole of graphite-like fine grains is within a range of 0.5~2.1 nm.

According to a further aspect of the present invention, there is provided an electrode active material for an energy storage device produced by heat treating a carbon material, oxidizing the carbon material with an oxidant and then reducing the oxidized carbon material through heat treatment, wherein an interlayer distance of graphite-like fine grain is within a range of 0.34~0.5 nm.

According to a still further aspect of the present invention, there is provided an electrode for an energy storage device, comprising an active material, a conductive material, a binder and a current collector, wherein the electrode has an electrode density of 0.7~1.1 g/ml.

The electrode may have an electrode expansion rate of no more than 25% due to application of voltage of 3.0 V and a capacitance per electrode volume of no less than 25 F/ml.

Further, 80~95 parts by weight of the active material may be included with respect to total 100 parts by weight of the active material, the conductive material and the binder.

According to a still further aspect of the present invention, there is provide an energy storage device which comprises a negative electrode, a positive electrode and an electrolytic solution, wherein at least one of the negative and positive electrodes comprises an active material produced by the claimed method.

At least one of the negative and positive electrodes may have an electrode density of 0.7~1.1 g/ml.

The electrolytic solution may contain at least one selected from the group consisting of quaternary ammonium salt, quaternary imidazolium salt, quaternary pyridinium salt, quaternary hoshonium salt and lithium salt.

Further, at least one of the negative and positive electrodes may have an electrode expansion rate of no more than 25% due to application of voltage of 3.0 V and a capacitance per electrode volume of no less than 25 F/ml.

DETAILED DESCRIPTION OF THE INVENTION

Hereinafter, the preferred embodiments of the present invention will be described in detail.

First, an electrode active material and a method for producing the electrode active material according to the present invention are explained.

The method for producing an electrode active material according to an embodiment of the present invention comprises the steps of pre-treating a carbon material through heat treatment, and oxidizing the pre-treated carbon material with an oxidant. The method of the present invention may further comprise the step of cleansing and drying the oxidized carbon material, as an essential step. In particular, the method of the present invention may further comprise the step of reducing the oxidized carbon material through heat treatment.

That is, the method of the invention comprises a pre-treating step of removing volatile components of the carbon material or improving crystallinity of the carbon material and an oxidation step of oxidizing the carbon material. In addition, the method may further comprise a cleansing step of removing foreign substances included in the oxidation step and a reduction step of removing a part or whole of oxygen produced in the oxidation step.

According to the invention, the carbon material is not particularly limited so long as its electrochemical properties can be improved through the pre-treatment and the oxidation treatment. In addition, any carbon materials can be utilized if they are further improved through the heat treatment and reduction step. Hard carbon may also be employed. As a result of repeated experiments, soft carbon mainly comprised of graphite-like fine grains is most preferable.

For example, the soft carbon may include one or more materials selected from the group consisting of alphatic polymer compound such as vinyl chloride resin and polyacrylonitrile, aromatic polymer compound such as mesophase pitch and polyimide, coal tar pitch, petroleum coke, coal tar coke, mesocarbon microbeads, and mesophase pitch spinning fiber.

The particle size of the soft carbon is determined by the type of soft carbon used. In general, the size is preferably no more than 200 µm, more preferably within a range of 10~100 µm.

The pre-treatment step is carried out by heat treating a carbon material for 2~24 hours at a temperature of 300~2000° C. under an inert atmosphere, for example, under an argon or nitrogen atmosphere. Through the pre-treatment, it is possible to remove volatile components contained in the carbon and to adjust the size of Lc (fine grains) by means of the time and temperature control. Preferably, the heat treatment is performed for 4~24 hours at a temperature of 600~1500° C.

In the oxidation step, an oxidant is used to oxidize a carbon material. Preferably, a carbon material containing soft carbon powder having graphite-like fine grains is oxidized in a mixed solution containing an oxidant such as peroxide.

The oxidant is not particularly specified herein. For example, the oxidant may includes one or more selected from the group consisting of $HNO_3$, $H_2SO_4$, $H_3PO_4$, $H_4P_2O_7$, $H_3AsO_4$, HF, $H_2SeO_4$, $HClO_4$, $CF_3COOH$, $BF_3(CH_3COOH)_2$, $HSO_3F$, $H_5IO_6$, $KMnO_4$, $NaNO_3$, $KClO_3$, $NaClO_3$, $NH_4ClO_3$, $AgClO_3$, $HClO_3$, $NaClO_4$, $NH_4ClO_4$, $CrO_3$, $(NH_4)_2S_2O_8$, $PbO_2$, $MnO_2$, $As_2O_5$, $Na_2O_2$, $H_2O_2$, $N_2O_5$, $C_2H_5OH$ and $CH_3OH$.

In the oxidation reaction, the oxidant and the peroxide intrudes into the interlayer of the graphite-like fine grains of a carbon material in the mixed solution containing the oxidant and peroxide to form an interlayer compound through ion bonding with carbon ($Cn^+$) in the interlayer surface. Then, a stable oxygen function group or oxygen cross-link is finally formed in the interlayer of the graphite-like fine grains.

In the experiments, a carbon material is preferably mixed with oxidant and peroxide in a temperature-adjustable beaker, flask or bath and then oxidized by stirring the mixture using a magnetic bar or ultrasonic. The treating temperature is preferably 0~100° C. in consideration of decomposition and boiling point of the peroxide.

The amount of oxidant (e.g., peroxide) used may vary according to the type of peroxide. Preferably, the oxidant is mixed with the pre-treated carbon material at a weight ratio of 0.5~10. The stirring period of time is preferably adjusted within a range of 0.1~48 hours.

In the cleansing process, to remove oxidant components such as peroxide remaining inside or outside of the carbon material, a hydrochloric acid or a large amount of water is added and stirred, and a filtering process is then repeated until a pH of drain water becomes 6~7.

After the cleansing step, a drying process is carried out for 1~24 hours at 50~200° C. under the atmosphere or under high vacuum of $10^{-1}$ torr or less.

In the heat treatment step, desired temperatures and time periods may be determined in multiple steps at a temperature of 100~1000° C. under high vacuum of $10^{-1}$ torr or less, or under an inert or reductive gas atmosphere. Preferably, it may be performed for 0.1~100 hours at a temperature of 100~500° C. and for 0.1~10 hours at a temperature of 500~1000° C.

An interlayer distance can be determined for the electrode active carbon powder using an X-ray diffraction method. In the X-ray diffraction experiment using Cu Kα ($\lambda$=0.15418 nm) ray, a crystal peak is observed at $2\theta$=24.7~27.0° in the pre-treatment step, and a crystal peak of 4.2~17.7° observed in the oxidation step disappears in the reduction step, and a crystal peak of 17.7~26.0° is then observed. The interlayer distances of the graphite-like fine grains determined by the Bragg's law after each step of the invention are 0.33~0.36 nm in the pre-treatment step, 0.5~2.1 nm in the oxidation step and 0.34~0.5 nm in the reduction step.

This means that the interlayer distance of the graphite-like fine grains is significantly increased through the oxidation process as compared with the interlayer distance ($d_{002}$) of 0.33~0.36 nm for the graphite-like fine grains of a carbon material such as soft carbon after the pre-treatment process. The increased extent of the interlayer distance can be controlled by the size and arrangement of chemical species intruded into the interlayer. Further, due to the reduction process through heat treatment, a part or whole of oxygen is removed to reduce the interlayer distance of the graphite-like fine grains such that electrochemically stable fine pores can be formed.

Hereinafter, an electrode of an energy storage device having the active material will be explained.

The electrode of an energy storage device according to the present invention comprises an active material produced by heat treating and then oxidizing a carbon material, a conductive material, a binder and a current collector. The electrode has an electrode density of 0.7~1.1 g/ml.

It is preferred that the active material be manufactured through the aforementioned production method.

The method for producing a carbon electrode containing the active material according to the invention is not particularly specified herein. For example, the electrode may be manufactured by the same way as when using a conventional active carbon. For example, when manufacturing an electrode in the form of a sheet, an active material produced according to the invention is crashed to 10~100 μm and mixed with a conductive material (carbon black etc.) or a conductive aid for providing conductivity to the carbon material, in addition to, for example, a binding agent or binder (polytetrafluoroethylene, PTFE), and the mixture is finally rolled through a roll press to be manufactured into a sheet form.

Here, the conductive material may include powdered graphite and carbon nanotube in addition to the carbon black. The binder may include CMC (carboxymethylcellulose), PVA (polyvinyl alcohol), PVDF (polyvinylidene fluoride), PVP (polyvinylpyrrolidone), MC (methyl cellulose), latex such as ethylene vinyl chloride copolymer resin, vinylidene chloride latex, chlorinated resin, vinyl acetate resin, poly(vinyl butyral), polyvinyl formal, bisphenol epoxy resin, styrene butadiene rubber (SBR) such as butadiene rubber, isoprene rubber, nitrile butadiene rubber, urethane rubber, silicone rubber and acrylic rubber, or the like, in addition to PTFE. At this time, the mixing ratio of the active carbon of the invention, the conductive material (carbon black) and the binder (PTFE) by weight can be controlled, for example, within 10~1:0.3~10:0.3~1. Preferably, 80 to 95 parts by weight of the active material is contained with respect to the total 100 parts by weight of the active material, conductive material and binder.

Further, in order to form an electrode, it is preferred that the active carbon and the carbon black are uniformly distributed and sufficiently mixed in an entangled structure with PTFE fibers, and then repeatedly rolled in longitudinal and transverse directions using a roll press.

The electrode of the present invention so configured has an electrode density of 0.7~1.1 g/ml, an electrode expansion coefficient of no more than 25% due to application of a voltage of 3.0 V and a capacitance per electrode volume of no less than 25 F/ml. Thus, the electrode can be suitably applied to an energy storage device, and more particularly, to an EDLC and a hybrid capacitor.

Hereinafter, the energy storage device according to the invention will be explained.

The energy storage device of the invention comprises negative and positive electrodes and an electrolytic solution. At least one of the negative and positive electrodes comprises an active material produced through the aforementioned method. Preferably, at least one of the negative and positive electrodes has an electrode density of 0.7~1.1 g/ml. The negative and positive electrodes may include the aforementioned electrode of the energy storage device. The electrode containing the aforementioned active material has an electrode expansion rate of no more than 25% due to application of voltage of 3.0 V and a capacitance per electrode volume of no less than 25 F/ml. In particular, the energy storage device may be an energy storage device using ion intercalation/deintercalation, and particularly may become an EDLC.

In a case where an electrode is essentially comprised of the electrode active material of the invention, fine pores formed in a plurality of interlayer in graphite-like fine grains effectively function as an interface forming an electrochemical double layer. Thus, when an EDLC is manufactured in such a manner that the active carbon electrodes formed of the electrode active material of the present invention are disposed at the positive and negative poles, respectively, in an electrolytic solution with a partition membrane interposed between the electrodes, it is possible to sufficiently improve the capacitance and energy density of the EDLC. If a voltage is applied to the EDLC, solvated electrolytic ions are intercalated into fine pores formed in the interlayer of graphite-like fine grains of the active carbon to form an electrochemical double layer and thus to create capacitance.

In case of an active carbon produced through the conventional alkaline activation process, electrolytic ions are intercalated into the interlayer of graphite-like fine grains of soft carbon, as described above. In the alkaline activation method, soft carbon is mixed with caustic alkali such as KOH, NaOH, RbOH or CsOH and then activated at a temperature of 600~800° C. under an inert atmosphere, so that fine cracks can be formed partially inside the carbon grains due to alkaline ions activated at the high temperature. If the active carbon produced by the alkaline activation method is applied to an EDLC, the fine cracks in the active carbon serve as a passageway of the electrolytic ions to allow the ions to be intercalated into the interlayer of graphite-like fine grains of the active carbon.

However, since the interlayer distance ($d_{002}$) of graphite-like fine grains of the active carbon produced by the alkaline activation method is generally within a range of 0.360~0.380 nm, it can be expected that resistance for electrolytic ions to be intercalated into the interlayer is large in consideration of a radius of electrolytic ion. In general, electrolyte (ion radius) used in an EDLC or hybrid capacitor includes $LiBF_4$ ($Li^+$: 0.18 nm, $BF_4^-$: 0.26 nm), $Et_4NBF_4$ ($Et_4N^+$: 0.455 nm, $BF_4^-$: 0.26 nm), $Et_3MeNBF_4$ ($Et_3MeN^+$: 0.425 nm, $BF_4^-$: 0.26 nm), $LiPF_6$ ($Li^+$: 0.18 nm, $PF_6^-$: 0.305 nm). In order for these electrolytic ions to be intercalated into the interlayer of graphite-like fine grains with a size of 0.360~0.380 nm, an electric field activation is first performed in the EDLC using a high voltage of no less than 3.5 V and a low-voltage capacitance is then obtained. However, an increase in the resistance for electrolytic ions to be overly intercalated into the interlayer and thus the repeated expansion and contraction of the active carbon results in the reduction of charge and discharge life of the EDLC.

However, since the electrode active material produced by the present invention has an interlayer distance of 0.34~0.5 nm of graphite-like fine grains, the intercalation resistance of electrolytic ions into the carbon layer is low and the expansion and contraction of carbon is suppressed.

On the other hand, the energy storage device of the present invention and particularly the EDLC has the positive and negative electrodes immersed in an electrolytic solution in a state where a partition membrane is interposed between the electrodes. At least one of the positive and negative electrodes contains the aforementioned electrode active material. The active material contained in the carbon electrode is the soft carbon having a graphite-like interlayer crystal structure according to the present invention. The interlayer distance of fine grains is 0.34~0.5 nm and fine pores formed in each carbon interlayer serve as an interface where an electrochemical double layer is formed by electrolytic ions, and thus, a capacitance per electrode volume of at least 25 F/ml and a low internal resistance can be obtained.

In addition, the electrolytic solution used in the EDLC of the invention is not particularly specified herein, but may employ a conventional electrolytic solution for use in the EDLC. In a case where an aqueous electrolyte is used, the reduction process can be omitted from the method of producing a carbon material containing soft carbon. However, since the aqueous electrolyte has a low electrochemical decomposition voltage, the operating voltage is restricted to no more than 1 V. Therefore, an organic solvent (non-aqueous) electrolytic solution is preferred in increasing the operating voltage.

The kind of an electrolytic solution is not particularly specified herein but generally selected considering the solubility of solute, degree of dissociation and viscosity of solution. An electrolytic solution having high conductivity and potential window is preferred. More preferably, the electrolyte solution includes at least one selected from the group consisting of quaternary ammonium salt, quaternary imidazolium salt, quaternary pyridinium salt, quaternary hoshonium salt and lithium salt. Typical examples include a solution where quaternary ammonium salt such as $Et_4NBF_4$ (tetraethyl ammonium tetrafluoroborate) or $Et_3MeNBF_4$ (triethylmethyl ammonium tetrafluoroborate) is dissolved in an organic solvent such as PC (propylene carbonate) and ACN (acetonitrile).

Hereinafter, specific experimental examples and comparison examples of the present invention will be explained. However, the examples are provided to more specifically describe the present invention but are not intended to limit the technical scope of the present invention.

EXAMPLE

Petroleum needle coke serving as soft carbon was used to produce an active carbon for an EDLC was produced through a pre-treatment process, an oxidation process, a cleansing process and a heat treatment/reduction process.

In the pre-treatment process, the soft carbon was heat treated for 4 hours at a temperature of 750° C. under an Ar gas atmosphere. In the oxidation process, 5 g of the heat treated carbon powder was stirred for 24 hours along with 35 g of $NaClO_3$ powder and 150 ml of $HNO_3$ at a room temperature in a 500 ml flask with a round bottom. In the cleansing and drying process, the oxidized carbon powder was filtered through a filtering apparatus and then stirred for 1 hour at a room temperature in a beaker containing 40 ml of HCl and 120 ml of distilled water (volume ratio is 1:3). The mixture was cleansed with a large amount of distilled water in the filtering apparatus until the drain water has a pH of about 7. Finally, in order to remove impurities of carbon, it was stirred with a solution of ethanol and distilled water (1:1) and then filtered using a filtering device. Then, it was placed for 1 hour in a dryer maintained at a temperature of 80° C. and heat treated for 12 hours at a temperature of 150° C. in a vacuum dryer maintained at a vacuum pressure of $10^{-1}$ torr.

The interlayer distance of graphite-like fine grains in carbon powder subjected to the pre-treatment, oxidation, cleansing and reduction processes was found 0.38 nm according to the results of X-ray diffraction analysis. An electrode made of the active carbon powder was found to have an electrode density of 0.90 g/ml. An EDLC fabricated using this electrode exhibited a capacitance per mass of 36.2 F/g and a capacitance per volume of 30.2 F/ml at 0~3 V. AC resistance at 1 kHz has been found to be 0.45Ω.

Comparison Example 1

In the above example, after only the pre-treatment process was carried out, material property tests for an electrode were made. That is, petroleum needle coke was used as soft carbon and heat treated for 4 hours at a temperature of 750° C. under an Ar gas atmosphere. According to the result of X-ray diffraction analysis, the soft carbon subjected to the pre-treatment was found to have an interlayer distance $d_{002}$ of 0.346 nm on a layer corresponding to a lattice plane (002) of graphite-like fine grains. An electrode made of the carbon powder was found to have an electrode density of 1.21 g/ml. An EDLC fabricated using this electrode exhibited a capacitance per mass of 4.9 F/g and a capacitance per volume of 4.7 F/ml at 0~3 V. AC resistance at 1 kHz has been found to be 0.6Ω.

Comparison Example 2

Petroleum needle coke was used as soft carbon to produce carbon for an electrode active material through a pre-treatment process, an alkaline activation process, a cleansing process and a reduction process.

In the pre-treatment process, the soft carbon was heat treated for 4 hours at a temperature of 750° C. under an Ar gas atmosphere. In the alkaline activation process, 10 g of the pre-treated carbon powder was charged into a Ni container along with 40 g of KOH and then activated for 2 hours at a temperature of 800° C. under an Ar gas atmosphere. In the cleansing process for removing impurities introduced into the carbon power during the activation process, it was charged into a 500 ml beaker together with a large amount of distilled water and stirred for 24 hours. Then, it was cleansed with a large amount of distilled water in a filtering apparatus until the drain water has a pH of about 7, and was then dried for 1 hour in a dryer maintained at a temperature of 80° C. In the reduction process, the dried carbon powder was heat treated for 2 hours at a temperature of 750° C. in a hydrogen gas atmosphere.

According to the result of X-ray diffraction analysis, the carbon power subjected to the pre-treatment, alkaline activation, cleansing and reduction processes was found to have an interlayer distance $d_{002}$ of graphite-like fine grains of carbon powder of 0.360 nm. An electrode made of the carbon powder was found to have an electrode density of 1.06 g/ml. An EDLC fabricated using this electrode exhibited a capacitance per mass of 30.1 F/g and a capacitance per volume of 26.4 F/ml at 0~4 V after performing three times the charge and discharge of 0~4 V. AC resistance at 1 kHz has been found to be 2.05Ω.

Comparison Example 3

As conventional active carbon using a specific surface area, RP20 (Kuraray chemical Co., specific surface area: 1980 m²/g) was used to manufacture an electrode and an EDLC. The electrode was manufactured in the same way as described above. In order to remove moisture within pores of active carbon, the electrode was dried for 12 hours at a temperature of 150° C. in a vacuum dryer maintained at a vacuum pressure of $10^{-1}$ torr.

As a result of X-ray diffraction analysis for the active carbon powder, a diffraction peak corresponding to $d_{002}$ was not exhibited. An electrode made of the active carbon powder was found to have an electrode density of 0.56 g/ml. An EDLC fabricated using this electrode exhibited a capacitance per mass of 34.6 F/g and a capacitance per volume of 16.2 F/ml at 0~3 V. AC resistance at 1 kHz has been found to be 0.90Ω.

Experimental Example

A method for measuring characteristic values and a method for manufacturing an electrode and an EDLC in the above example and comparison examples are as follows.

(a) Interlayer distance in lattice plane

The interlayer distance d in a carbon layer was calculated from the diffraction peaks obtained from the X-ray diffraction method. Monochromatic Cu Kα ($\lambda$=0.15418 nm) ray monochromatized by graphite monochromator was used to obtain X-ray diffraction peaks and the following Bragg's law was used for calculation.

$$d=\lambda/(2\sin\theta) \quad (1)$$

(b) Manufacture of electrode 10 wt % of carbon black and 10 wt % of PTFE were added to and mixed with 80 wt % of carbon powder screened to a range of 10~100 μm to form a sheet with a thickness of 1 mm. The sheet was rolled about 15 times in vertical and horizontal directions using a roll press to manufacture a carbon electrode in the form of a sheet with a thickness of 150 μm.

(c) Electrode density

The carbon electrode was dried for 12 hours at a temperature of 150° C. under a vacuum pressure of 0.1 torr. The electrode density was obtained by dividing the electrode weight by the apparent volume thereof.

(d) Manufacture of EDLC

The carbon electrode in the form of a sheet was bonded to an etching aluminum foil (a current collector) using a conductive adhesive, and a roll press maintained at a surface temperature of 150° C. was used to increase a bonding force. The electrode was cut into 2 cm×2 cm and one end of the current collector (to which the electrode is not attached) was cut in a longitudinal direction to be used as a terminal. The carbon electrode, the partition membrane (Celgard 3501) and a laminate polymer pouch with three closed sides were prepared. The electrode, collector and membrane were stacked in order of 'collector A—carbon electrode A—partition membrane—carbon electrode B—collector B', which in turn was put into the polymer pouch. Using an electrolyte injector capable of adjusting a vacuum pressure, an electrolytic solution where 1.2M Et$_4$NBF$_4$ is dissolved in ACN was injected into the pouch which in turn was vacuum packed. The polymer pouch was beforehand provided with a space for separating and removing gas which might be generated during application of excessive voltage.

(e) Measurement of capacitance

For measurement of the capacitance of the EDLC, a charging/discharging tester (MACCOR, Model MC-4) was used to carry out the charge and discharge according to a constant current method. The measurement was made at a driving voltage of 0~3 V or 0~3.5 V and at an applied current density of 2 mA/cm². The capacitance of EDLC was calculated from a time-voltage curve at third constant discharge, using the following equation.

$$C(\text{Capacitance},F)=dt \cdot i/dV \quad (2)$$

The capacitance per mass (F/g) and capacitance per volume (F/ml) of active carbon are obtained by dividing the capacitance value computed from the equation (2) by the weight of an active carbon material in both electrodes and the volume of electrodes, respectively.

(f) Measurement of AC resistance

An internal resistance of EDLC was measured using an impedance analyzer (Zahner IM6) after a third constant-current discharge has been made. The internal resistance behavior was examined at a frequency range of 100 kHz~2.5 MHz. The values specified in the example and the comparison examples of the present invention denote AC resistance values at 1 kHz.

The experimental results in the example and comparison examples are summarized in Table 1.

TABLE 1

| | Interlayer distance (nm) | Electrode density (g/ml) | Capacitance (F/g) | Capacitance (F/ml) | Resistance (at 1 kHz) ($\Omega$) |
|---|---|---|---|---|---|
| Example | 0.380 | 0.90 | 36.2 | 30.3 | 0.45 |
| Comparison Example 1 | 0.346 | 1.21 | 4.9 | 4.6 | 0.60 |
| Comparison Example 2 | 0.360 | 1.06 | 30.1 | 26.4 | 2.05 |
| Comparison Example 3 | — | 0.56 | 34.6 | 16.2 | 0.90 |

As can be seen from Table 1, the lattice interlayer distance of the example carbon power (0.380 nm) manufactured through the pre-treatment, oxidation, cleansing and heat treatment processes using the soft carbon according to the present invention is drastically increased as compared with the lattice interlayer distance (0.346 nm) of the carbon powder according to the comparison example 1 manufactured through only the pre-treatment process using the same carbon material. It can be understood from this results that the lattice interlayer distance of EDLC has been expanded through the oxidation and reduction processes. Further, it is believed that the increase in capacitance per volume (F/ml) of EDLC according to the example is due to a fact that fine pores formed in the carbon interlayer by the increase of the interlayer distance of graphite-like fine grains function as an interface for forming an electrochemical double layer by electrolytic ions.

In addition, it can be understood that the lattice interlayer distance (0.380 nm) of graphite-like fine grains in the example is larger than the interlayer distance (0.360 nm) of graphite-like fine grains of carbon powder produced through the alkaline activation treatment using the same carbon material according to the comparison example 2. Furthermore, characteristics of EDLC of the example are superior to those of EDLC of the comparison example 2. It is believed that the resistance to intercalation of electrolytic ions into fine pores can be reduced due to the increase in the interlayer distance of graphite-like fine grains, and thus, the expansion/contraction of carbon powder can be reduced due to the reduced resistance to repeated intercalation of the electrolytic ions.

In addition, it can be understood that the capacitance per electrode volume of EDLC according to the example is about twice greater than that of EDLC using a specific surface area active carbon according to the comparison example 3 and that the resistance of EDLC according to the example is lower than that of EDLC by a specific surface area active carbon according to the comparison example 3.

From the foregoing, it can be understood that the lattice interlayer distance of the active carbon of the present invention is not particularly restricted but exhibits an excellent characteristic of 0.34~0.5 nm. Further, the EDLC using the active carbon exhibits high capacitance per volume (F/ml). In addition, the expansion of electrode is suppressed to improve the durability and reduce internal resistance of EDLC, thereby enhancing the output characteristics thereof.

Contrary to active carbon produced by a conventional alkaline activation method, an active material of the present invention can be produced in a simpler way, can have high capacitance per volume due to fine pores formed by increase in an interlayer distance of carbon and can also provide an advantageous effect of reducing the expansion of electrode caused by the application of voltage, so that the active material is useful in energy storage devices. In particular, the active material can be applied to an EDLC or a hybrid storage device where the active carbon is used in either electrode. The present invention may be a useful component capable of compensating for a performance/characteristic region that a conventional condenser and/or a secondary battery can not provide, since it functions as a power source for storing a large amount of energy and releasing the stored energy in several tens of seconds or a few minutes. Therefore, the present invention can be usefully employed in a memory back-up power source for a portable communications device and home electronics such cellular phones or AV devices and camera, and main or auxiliary power sources for UPS, hybrid electrical vehicle (HEV) or the like.

Although the present invention have been illustrated and described in connection with the preferred embodiments, it is only for illustrative purposes. It will be readily understood by those skilled in the art that various modifications and changes can be made thereto without departing from the spirit and scope of the present invention defined by the appended claims.

What is claimed is:

1. A method for suppressing the expansion of a carbonaceous electrode active material for an energy storage device, comprising:
    (a) pre-treating a particulate carbon material through heat treatment for 2~24 hours at a temperature of 300~2000° C. under an inert atmosphere;
    (b) oxidizing the pre-treated carbon material in a solution containing an oxidant at a temperature range of 0° C.~100° C. to produce graphite-like fine grains with an interlayer distance in a range of 0.5~2.1 nm;
    (c) reducing the oxidized carbon material through heat treatment for 0.1~100 hours at a temperature of 100~1000° C. and at a high vacuum pressure of no more than $10^{-1}$ torr under an inert or reductive gas atmosphere to produce graphite-like fine grains with an interlayer distance in a range of 0.34~0.5 nm; and
    (d) forming a carbonaceous electrode active material with suppressed expansion properties from the graphite-like fine grains of step (c), wherein the oxidant includes an acidic oxidant and a non-acidic oxidant, and wherein the acidic oxidant includes one or more selected from the group consisting of $HNO_3$, $H_2SO_4$, $H_3PO_4$, $H_4P_2O_7$, $H_3AsO_4$, HF, $H_2SeO_4$, $HClO_4$, $CF_3COOH$, $BF_3(CH_3COOH)_2$, $HSO_3F$ and $H_5IO_6$, and wherein the non-acidic oxidant includes one or more selected from the group consisting of $KMnO_4$ and $NaClO_3$.

2. The method as claimed in claim 1, further comprising the step of cleansing the oxidized carbon material.

3. The method as claimed in claim 1, wherein the carbon material is or comprises soft carbon.

4. The method as claimed in claim 3, wherein the soft carbon is formed of one or more materials selected from a group consisting of aliphatic polymer compound such as vinyl chloride resin and polyacrylonitrile, aromatic polymer compound such as mesophase pitch and polyimide, coal tar pitch, petroleum coke, coal tar coke, mesocarbon microbeads, and mesophase pitch spinning fiber.

5. The method as claimed in claim 1, wherein the non-acidic oxidant is $NaClO_3$.

6. The method as claimed in claim 1, wherein the oxidation step comprises the step of adding 0.5~10 parts by weight of the oxidant to 1 part by weight of the carbon material.

7. A method for making an electrode active material with suppressed expansion properties for an energy storage device, comprising:
- (a) pre-treating a particulate carbon material through heat treatment for 2~24 hours at a temperature of 300~2000° C. under an inert atmosphere;
- (b) oxidizing the pre-treated carbon material in a solution containing an oxidant at a temperature range of 0° C.~100° C. to produce graphite-like fine grains with an interlayer distance in a range of 0.5~2.1 nm;
- (c) reducing the oxidized carbon material through heat treatment for 0.1~100 hours at a temperature of 100~1000° C. and at a high vacuum pressure of no more than $10^{-1}$ torr under an inert or reductive gas atmosphere to produce graphite-like fine grains with an interlayer distance in a range of 0.34~0.5 nm; and
- (d) forming a carbonaceous electrode active material with suppressed expansion properties from the graphite-like fine grains of step (c), wherein the oxidant includes an acidic oxidant and a non-acidic oxidant, and wherein the acidic oxidant includes one or more selected from the group consisting of $HNO_3$, $H_2SO_4$, $H_3PO_4$, $H_4P_2O_7$, $H_3AsO_4$, HF, $H_2SeO_4$, $HClO_4$, $CF_3COOH$, $BF_3(CH_3COOH)_2$, $HSO_3F$ and $H_5IO_6$, and wherein the non-acidic oxidant includes one or more selected from the group consisting of $KMnO_4$ and $NaClO_3$.

8. An electrode active material for an energy storage device produced by the method as claimed in claim 7.

9. The method of claim 7, wherein the non-acidic oxidant is $NaClO_3$.

* * * * *